Nov. 19, 1940.  E. M. FOUGERA  2,222,290
LIQUID CONTAINER
Filed Oct. 22, 1938

Edmond M. Fougera
INVENTOR.

BY
ATTORNEY.

Patented Nov. 19, 1940

2,222,290

UNITED STATES PATENT OFFICE 2,222,290

LIQUID CONTAINER

Edmond M. Fougera, New York, N. Y., assignor to The Emfo Corporation, New York, N. Y., a corporation of New York Application October 22, 1938, Serial No. 236,404

3 Claims. (Cl. 91—67.4)

My device refers to liquid containers and refers particularly to containers from which it is desired to remove a portion of the contents for purposes of application to a surface.

One of the objects of my invention is a liquid container capable of being hermetically sealed when not in use and carrying liquid absorbent means whereby liquid within the container may be withdrawn by capillary attraction for use.

Another object of my invention is a liquid container adapted to protect a glass receptacle positioned therein from accidental breakage.

Another object of my invention is a liquid container so constructed that a glass receptacle therein may be readily withdrawn for purposes of filling it with a liquid.

Another object of my invention is a liquid container having a liquid absorbent member carried by its closure member whereby a portion of the liquid contents of the container may be applied without removal of the closure member.

Another object of my invention is a liquid container whereby the contents thereof may be received therefrom without exposing the liquid within the container to the atmosphere.

Another object of my invention is a liquid container in which its liquid contents are preserved in a hygienic condition free from possibility of contact with deleterious particles present in the atmosphere and in which they are protected from unnecessary evaporation.

The above mentioned and other desirable attributes are possessed by the container as will be evident upon a consideration of my specification and its accompanying drawing illustrating one form of the device of my invention and in which similar parts are designated by similar numerals.

Figure 1:
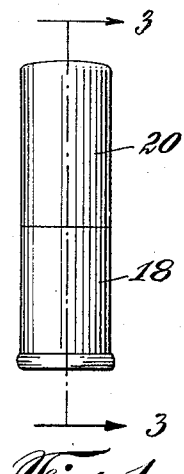
Figure 1 is a side view of a device of my invention in its complete form.
Figure 2:
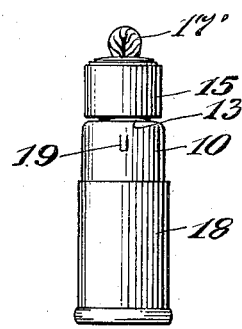
Figure 2 is a side view of the device of Figure 1 with the upper outer cover removed.
Figure 5:
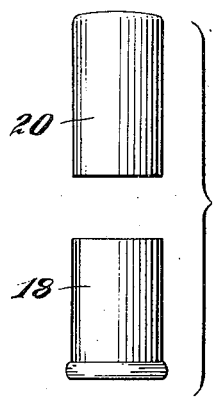
Figure 5 is a side view of the outer elements of the device of Figure 1.
Figure 3:
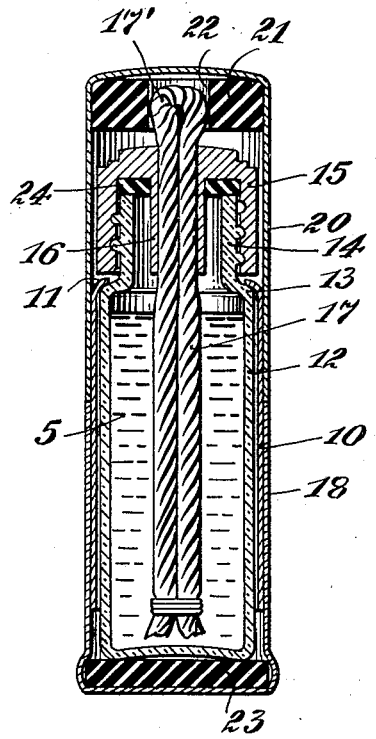
Figure 3 is an enlarged section through the line 3—3 of Figure 1.
Figures 4, 6:
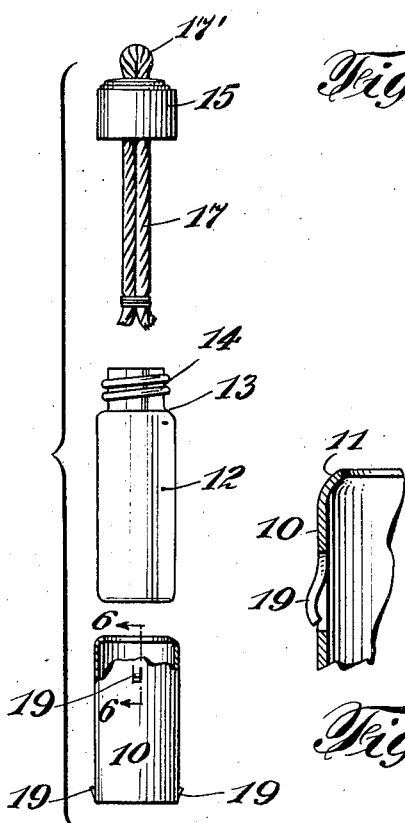
Figure 4 is a side view of the inner elements of the device of Figure 1.
Figure 6 is an enlarged section through the line 6—6 of Figure 4.

The particular form of the device of my invention shown in the accompanying drawing comprises a cylindrical shell 10, open at both ends the upper end of which has an inwardly inclined flange 11.

Positioned within the shell 10 is a bottle 12 somewhat longer than the shell and having the shoulder 13 and the threaded neck 14.

An applicator comprises the interiorly threaded cap 15, having a hollow cylindrical downwardly extended member 16, through which an absorbent wick 17 is passed and maintained within the extended member 16, the cap 15 being adapted to mesh with the threaded neck 14 of the bottle 12, the lower portion of the wick 17 extending into the liquid 5 within the bottle 12.

The exterior casing comprises the lower member 18 abutable upon the outer face of the shell 10, and maintained in removable position thereon by means of a plurality of outwardly extended resilient cut outs 19, 19 of the shell 10; and the upper member 20. If preferred the upper inner portion of the upper casing member 20 may carry a rubber ring 21, with a central recess 22 for the reception of the upper end portion of the wick 17 when the casing members are assembled. The bottom casing member 18 may carry a rubber disc 23, if desired.

It will thus be seen that the cap 15 prevents the bottle 12 from passing downwardly through the shell 10, and the shoulder 11 of the shell prevents the bottle from passing upwardly through the shell 10.

A rubber washer 24 between the upper interior face of the member 15 and the upper face of the bottle neck 14 serves to form a complete closure of the bottle preventing the accidental spilling of the contents.

The operation of the device is as follows:—

When the device is in its complete form as shown in Figure 1, the cap 20 is removed thus exposing the upper portion 17' of the wick 17, which is moist with the liquid contents of the bottle 12 and hence can be applied to the face or elsewhere if desired.

It is to be noted that while a suitable portion of the bottle contents can thus be employed, that portion of the contents within the bottle is completely protected from atmospheric contamination and that it cannot be accidentally spilled from the bottle.

When it is desired to introduce a liquid into the bottle 12, the closure cap 15 is unscrewed from the bottle neck 14.

By "wick" in my specification and claims, I mean a device composed of any absorbent material having such capillary properties as to draw a liquid from the bottle, into which the lower portion of the wick is immersed.

It will thus be seen that my invention presents a sheathed and protected liquid receptacle from which a portion of the contained liquid may be absorbed for application without exposing the remaining liquid to atmospheric contact.

I do not limit myself to the particular size, shape, number, material or arrangement of parts as particularly shown and described as these are given solely for the purpose of clearly describing my invention.

What I claim is:

1. A liquid container comprising an exterior casing consisting of a lower member closed at the bottom and open at the top and a removable upper member, an interior shell positioned within said exterior casing and extending above the lower member thereof adapted to receive a liquid container, a liquid container closed at one end and open at the other end positioned within said shell, a removable closure member adapted to close the open end of said container and a dependent absorbent element carried by said closure member and extending into said container.

2. A liquid container comprising an exterior casing consisting of a lower member closed at the bottom and open at the top and a removable upper member, an interior shell positioned within said exterior casing and extending above the lower member thereof adapted to receive an upwardly removable liquid container and means adapted to prevent the upward removal of said container from said shell, a liquid container closed at one end and open at the other end positioned within said shell, a removable closure member adapted to close the open end of said container and a dependent absorbent element carried by said closure member and extending into said container.

3. A liquid container comprising an exterior casing consisting of a lower member closed at the bottom and open at the top and a removable upper member, a resilient member within said bottom member, an interior shell positioned within said exterior casing and extending above the lower member thereof adapted to receive a liquid container, a liquid container closed at one end and open at the other end positioned within said shell, a removable closure member adapted to close the open end of said container and a dependent absorbent element carried by said closure member and extending into said container.

EDMOND M. FOUGERA.